United States Patent
Ditzler

(10) Patent No.: US 7,814,985 B2
(45) Date of Patent: *Oct. 19, 2010

(54) GREASE ACTUATED BALL AND SOCKET JOINT

(75) Inventor: Steven J. Ditzler, Bellevue, IA (US)

(73) Assignee: Deere & Company, Moline, IL (US)

( * ) Notice: Subject to any disclaimer, the term of this patent is extended or adjusted under 35 U.S.C. 154(b) by 66 days.

This patent is subject to a terminal disclaimer.

(21) Appl. No.: 12/256,470

(22) Filed: Oct. 22, 2008

(65) Prior Publication Data

US 2009/0050342 A1    Feb. 26, 2009

Related U.S. Application Data

(63) Continuation of application No. 11/171,707, filed on Jun. 30, 2005, now Pat. No. 7,476,050.

(51) Int. Cl.
*E02F 3/76* (2006.01)
*F16C 11/06* (2006.01)

(52) U.S. Cl. .......................................... 172/821; 403/39
(58) Field of Classification Search ................. 37/266, 37/268, 272, 279–283; 172/777–781, 272–276, 172/801–809, 748, 810–828; 403/34–39, 403/137, 145, 148; 269/20, 25, 35, 37, 75; 92/118, 135, 162 P, 183
See application file for complete search history.

(56) References Cited

U.S. PATENT DOCUMENTS

| | | | | |
|---|---|---|---|---|
| 3,631,931 A * | 1/1972 | Frisbee | .................. | 172/821 |
| 3,648,782 A * | 3/1972 | Mazzarins | .................. | 172/821 |
| 3,737,130 A * | 6/1973 | Shiraishi | .................. | 248/181.1 |
| 5,738,344 A * | 4/1998 | Hagman | .................. | 269/75 |
| 6,641,323 B2 * | 11/2003 | Ronsheim | .................. | 403/90 |

* cited by examiner

*Primary Examiner*—Robert E Pezzuto
(74) *Attorney, Agent, or Firm*—Baker & Daniels LLP

(57) ABSTRACT

A socket assembly including a housing having a bore; an insert member disposed in the bore, the insert member defining a socket; and a cap attached to the housing proximate an inlet of the bore and having an opening to receive a connecting member that extends into the socket.

30 Claims, 6 Drawing Sheets

GREASE ACTUATED BALL AND SOCKET JOINT

CROSS REFERENCE TO RELATED APPLICATION

This application is a continuation of U.S. patent application Ser. No. 11/171,707, entitled "Grease Actuated Ball and Socket Joint," filed on Jun. 30, 2005 by the same inventor hereof, the disclosure of which is expressly incorporated herein by reference.

BACKGROUND

1. Field of the Invention

The present invention generally relates to ball and socket joint assemblies and more particularly relates to configurations that facilitate grease actuated adjustment of such assemblies.

2. Description of the Related Art

Ball and socket joint assemblies are useful in many applications, including connecting rod assemblies, steering knuckle and drag link assemblies used in vehicles, and for providing pivotal movement between tools and construction machines to which the tools are attached. FIG. 1 shows a conventional ball and socket joint assembly. Socket assembly 100 includes a generally cylindrical, hardened steel housing 110 welded to bracket 108 and defining a socket 109 in which a substantially spherical ball 140 may be disposed to form a joint. Socket assembly 100 also includes semicircular shims 112, 113, 114, 115, 116, 117 positioned flush against housing 110 adjacent to the inlet of socket 109. While only three (3) sets of shims are shown in FIG. 1, in many applications up to six (6) sets of shims are used. Shims 112-117 provide spacing between housing 110 and cap 130, which is tightened by bolts 131, 132, 133, 134, 135, 136 against housing 110 through shims 112-117. Both housing 110 and shims 112-117 define corresponding openings to receive bolts 131-136.

It is desirable in most applications to maintain a predetermined tolerance within the ball and socket joint. As ball 140 rotates within socket 109, both ball 140 and socket 109 wear to create excess space within socket 109. To account for this wear, socket assembly 100 is adjusted by removing pairs of shims 112-117 to re-establish a proper fit between ball 140 and socket 109. This adjustment is difficult to perform because it requires disassembly of socket assembly 100, including removal of bolts 131-136 and cap 130. This disassembly is further complicated by the fact that ball and socket joint assemblies are often positioned in hard to reach places in the vehicles and/or construction machines in which they are used. Consequently, the adjustment of socket assembly 100 is many times avoided.

Additional problems accompany the use of socket assembly 100. The use of multiple shims 112-117 cause bolts 131-136 to lose their torque during equipment operation. Grit and debris may build up on shims 112-117 over time. When bolts 131-136 are torqued onto housing 110, bolts 131-136 clamp cap 130 against housing 110, with shims 112-117 sandwiched in between. Subsequent vibration, however, may dislodge the debris on shims 112-117, thereby reducing the clamping forced applied by bolts 131-136. At a minimum, this requires more frequent adjustments to socket assembly 100, but may also result in damage to the equipment and/or safety concerns. Damage may also be caused to ball 140 and socket 109 if a machine operator removes too many shims 112-117 from socket assembly 100 during adjustment, thereby creating unwanted friction between ball 140 and socket 109. Additionally, because housing 110 of conventional socket assembly is made from hardened steel, difficulties are often encountered when attempting to weld housing 110 to other objects.

SUMMARY

The present invention provides a socket assembly that is readily adjustable without disassembly and that addresses the problems inherent with the use of shims. Another benefit of the present invention is that current applications utilizing socket assembly 100 may be retrofitted with the socket assembly of the present invention. Additionally, the present invention enables cap 130 to be replaced with a simpler, more cost effective snap ring retention.

In one form of the present invention, a vehicle is provided including a chassis, at least one ground engaging mechanism configured to propel the chassis over the ground, an engine operatively coupled to the at least one ground engaging mechanism to power propulsion of the chassis, a ground engaging tool configured to move relative to the chassis, and a socket assembly that couples the ground engaging tool to the chassis. The socket assembly includes a ball, a housing having a bore with an inlet, and an insert member disposed within the bore and defining a socket that receives the ball to couple the ground engaging tool to the chassis, the insert member configured to move axially within the bore.

In another form of the present invention, a vehicle is provided including a chassis, at least one ground engaging mechanism configured to propel the chassis over the ground, an engine operatively coupled to the at least one ground engaging mechanism to power propulsion of the chassis, a ground engaging tool configured to move relative to the chassis, and a socket assembly that couples the ground engaging tool to the chassis. The socket assembly includes a ball, a cylinder having a bore with an inlet, and a piston disposed within the cylinder and defining a socket that receives the ball to couple the ground engaging tool to the chassis, the piston and the cylinder together defining a reservoir within the bore, the piston being configured to move axially within the bore when a fluid is introduced into the reservoir.

In still another form of the present invention, a method of adjusting a socket assembly of a vehicle is providing. The method includes the step of providing a vehicle that includes a chassis, at least one ground engaging mechanism configured to propel the chassis over the ground, an engine operatively coupled to the at least one ground engaging mechanism to power propulsion of the chassis, a ground engaging tool configured to move relative to the chassis, and a socket assembly that couples the ground engaging tool to the chassis. The socket assembly includes a ball, a cylinder having a bore with an inlet, and a piston disposed within the cylinder and defining a socket that receives the ball to couple the ground engaging tool to the chassis, the piston and the cylinder together defining a reservoir within the bore. The method also includes the step of introducing a fluid into the reservoir of the socket assembly to urge the piston axially within the bore against the ball, the ball moving in the socket when the piston is urged against the ball.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Figure 1:
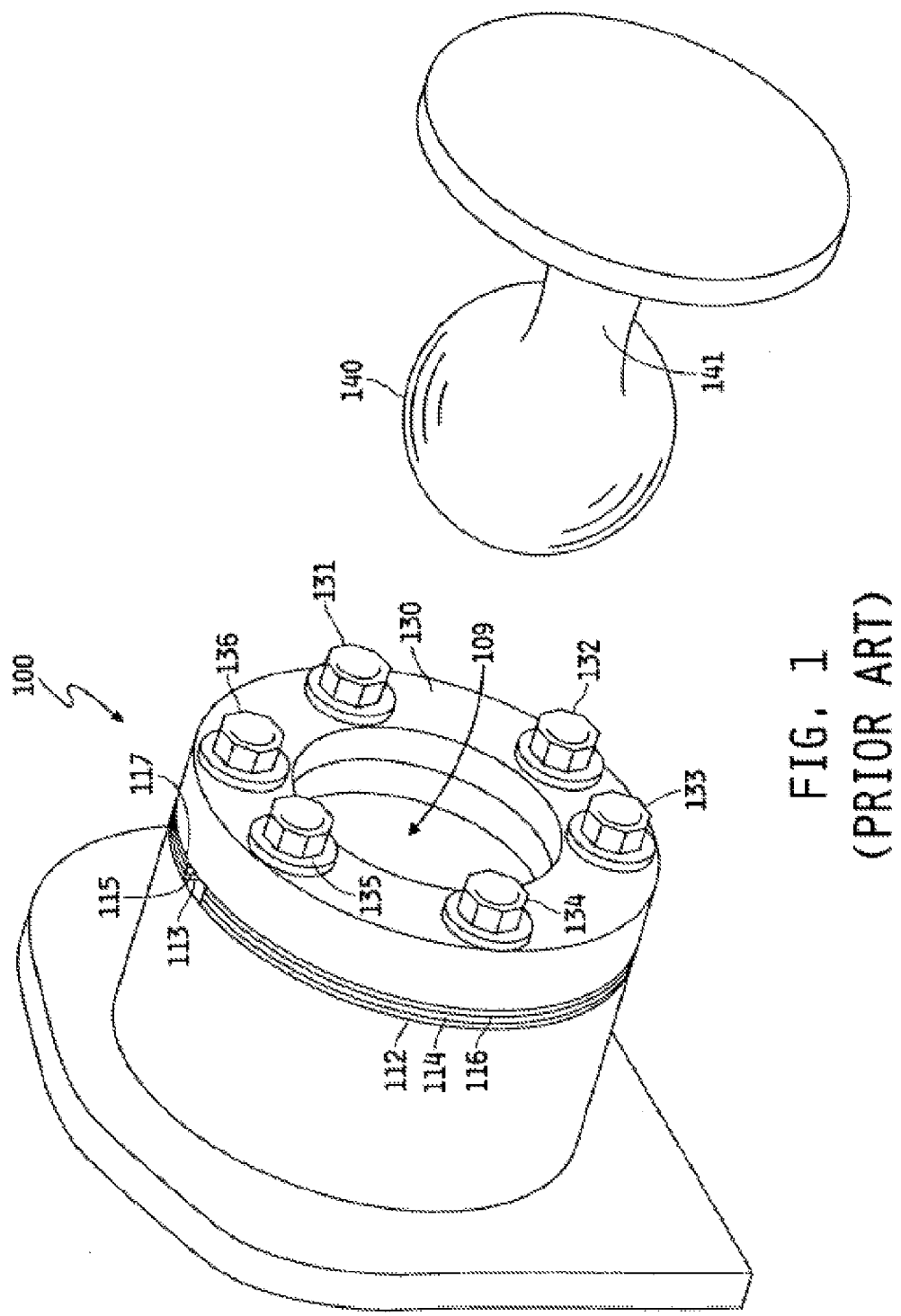
FIG. 1 is a perspective view of a ball and a conventional socket assembly.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION

The embodiments disclosed below are not intended to be exhaustive or limit the invention to the precise forms disclosed in the following detailed description. Rather, the embodiments are chosen and described so that others skilled in the art may utilize their teachings.

Figure 2:
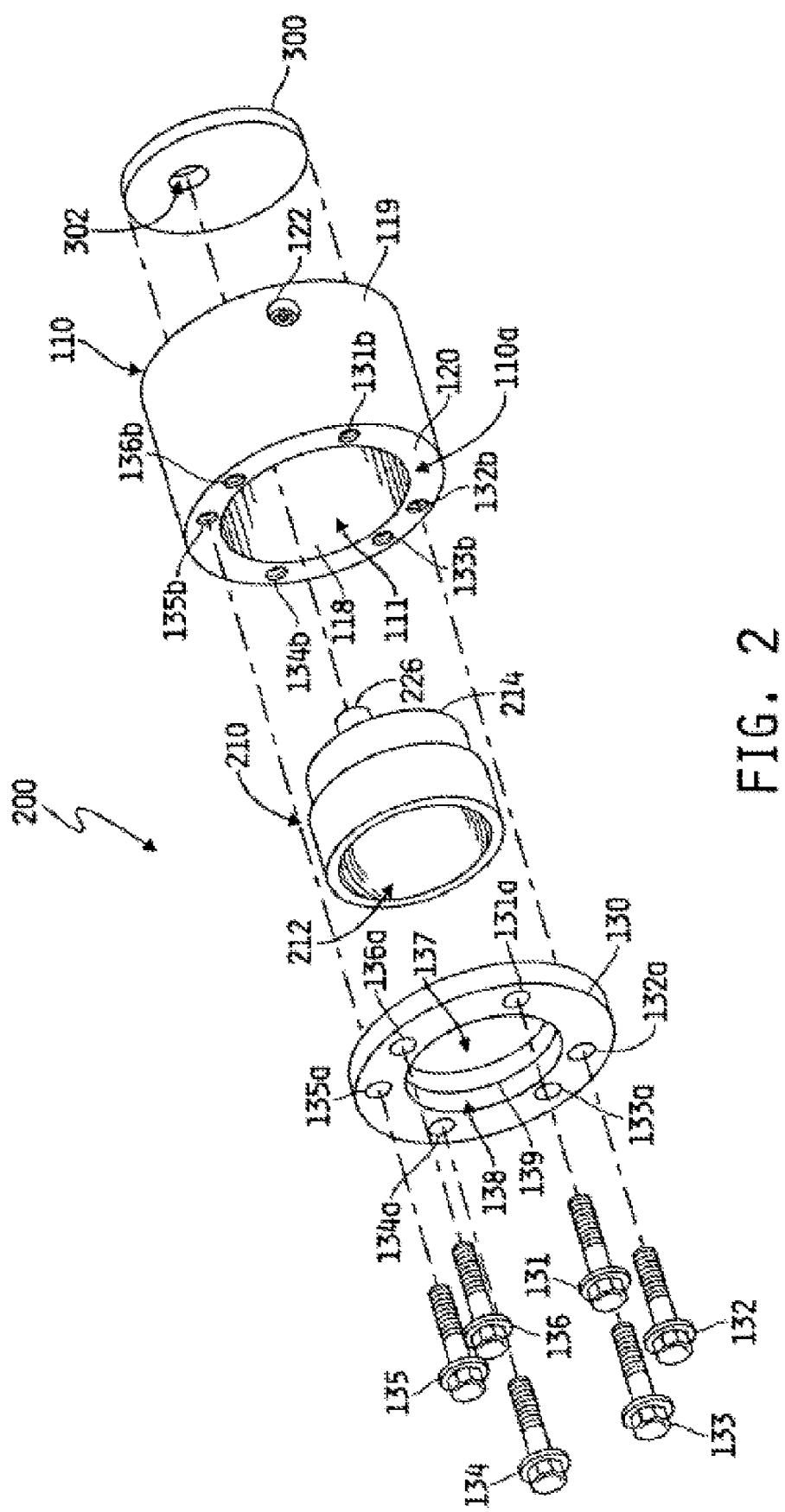
FIG. 2 is an exploded perspective view of the socket assembly of the present invention.

An exploded view of the socket assembly of the present invention is shown in FIG. 2. Socket assembly 200 includes housing 110, which may be made out of a weldable-grade material such as steel tubing. Bore 111 extends through housing 110, thereby providing housing 110 with an open end 110a and defining an inner housing surface 118. Bore 111 is large enough for a generally cylindrical insert member 210 to be inserted therein. In other words, the diameter of bore 111 is slightly larger than the outer diameter of insert member 210. Housing 110 also includes multiple holes 131b, 132b, 133b, 134b, 135b, 136b on the forward surface 120 of housing 110 adjacent to the inlet of bore 111. Holes 131b-136b have interior threads (not shown) and are configured to receive bolts 131-136. An aperture 122 extends through housing 110 into bore 111 from outer surface 119 to inner surface 118.

Cap 130 attaches to housing 110 with bolts 131-136, which extend through holes 131a, 132a, 133a, 134a, 135a, 136a of cap 130 and are received by holes 131b-136b of housing 110 as indicated above. In other embodiments of the present invention, cap 130 may be attached to housing 110 with a snap ring. Cap 130 has an opening 137 through which a connecting member, or ball stud 141, of ball 140 (FIG. 4) extends when ball 140 is positioned in socket 212 of insert member 210. Cap 130 also defines an interior surface 138 that is substantially spherical in shape to maintain ball 140 in socket 212 and to accommodate the movement of ball 140. Interior surface 138 may include a flange 139 about the inner periphery of cap 130 to better maintain ball 140 in socket 212. Additionally, because the diameter of ball 140 is greater than the diameter of opening 137, cap 130 may be comprised of two separable semicircular sections to enable ball 140 to be positioned within socket 212.

In an exemplary embodiment of the present invention, backing member 300 is affixed (for example, by welding) within the end of housing 110 distal from the inlet of bore 111 to form a closed end 110b (FIG. 4) of housing 110. In other embodiments, backing member 300 is affixed to the end of housing 110 distal from the inlet of bore 111 and may comprise a portion of the attachment to which socket assembly 200 is coupled in particular applications. Backing member 300 includes an opening 302, the use of which is explained below.

Figure 3:
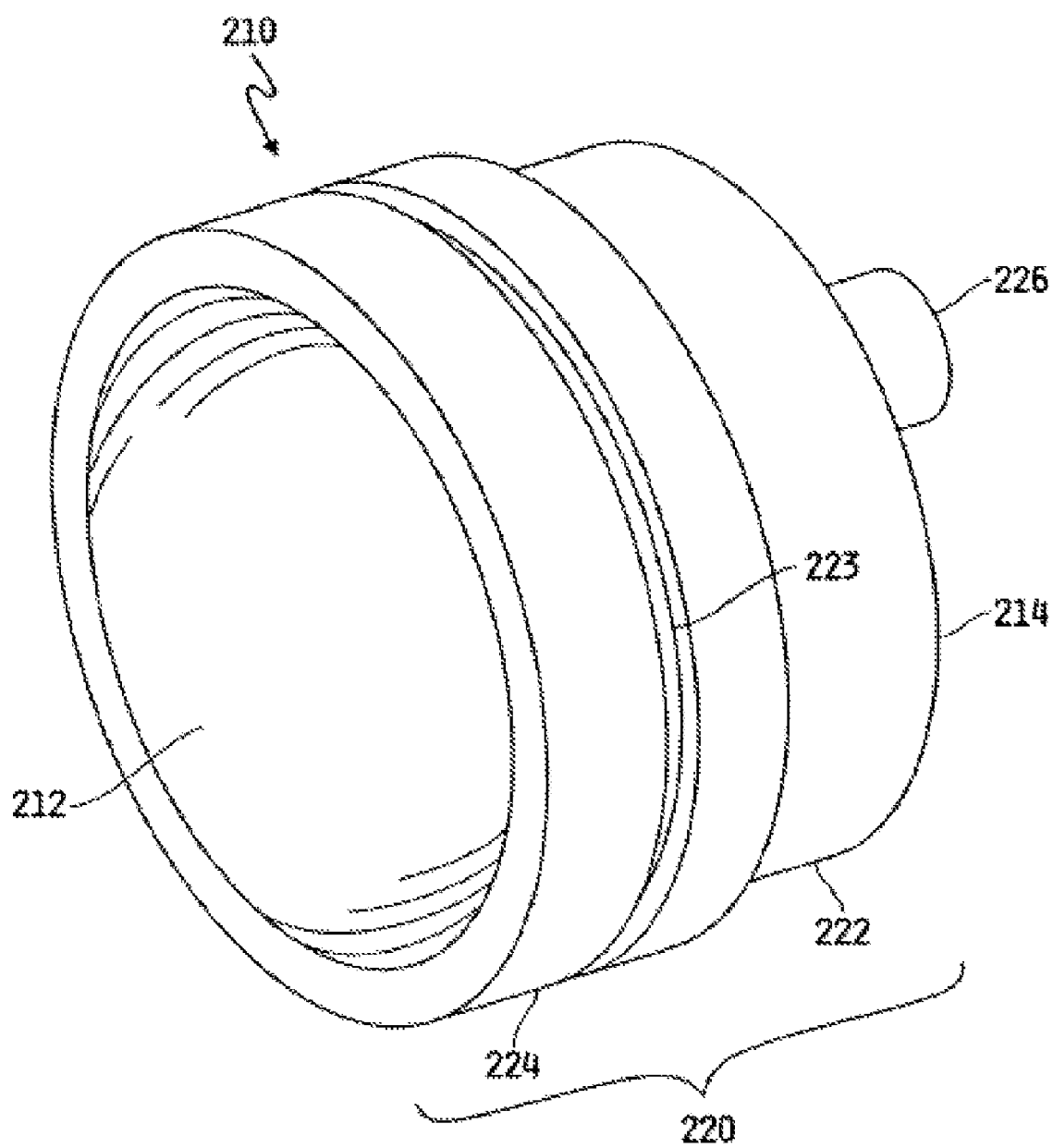
FIG. 3 is a perspective view of the insert member of the socket assembly of the present invention.
Figure 4:
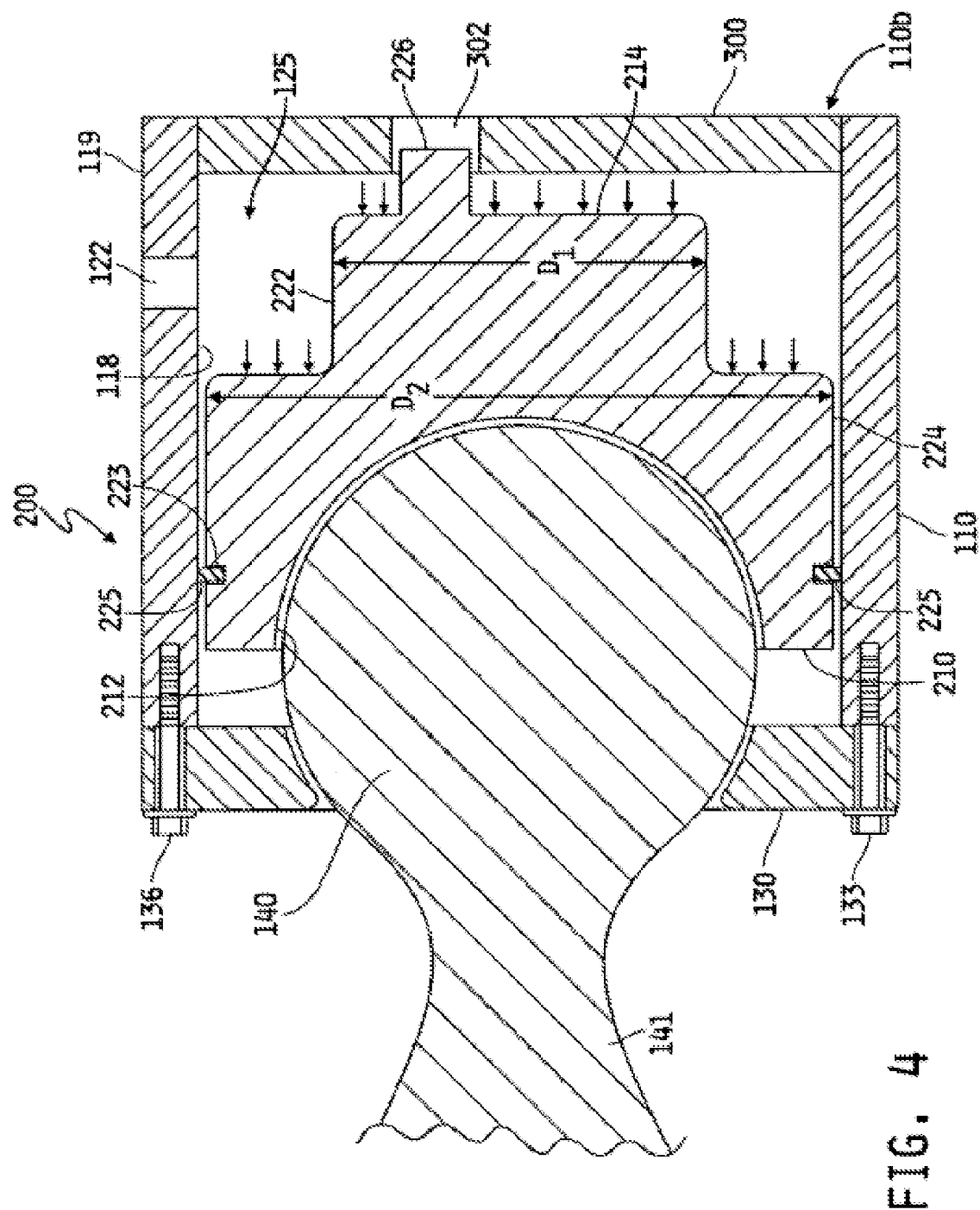
FIG. 4 is a cross-section view of the socket assembly of the present invention with a ball disposed in the socket.

Insert member 210 fits within housing 110 and has a socket 212 for receiving ball 140. Shown in greater detail in FIG. 3, insert member 210 may be machined from a commercial iron product such as steel. In an exemplary embodiment of the present invention, insert member 210 is formed to resemble a piston having an outer surface 220. Outer surface 220 includes a first end, or first outer surface portion, 222 and a second end, or second outer surface portion, 224. The diameter D2 of second outer surface portion 224 is greater than the diameter D1 of first outer portion 222 (FIG. 4). Second outer surface portion 224 may include about its periphery a groove 223 to receive a sealing member 225 (FIG. 4), for example, an O-ring, washer, or other object sized to be in sliding contact with and to seal against inner surface 118 of housing 110. Insert member 210 has a closed rear portion 214 opposite the opening of socket 212, thereby enabling socket 212 to form a substantially spherical cup within insert member 210. A post 226 extends from the outward facing surface of closed rear portion 214 into opening 302 of backing member 300 (FIG. 2). As is further described below, insert member 210 can be easily removed from socket assembly 200 and replaced when it becomes excessively worn.

The adjustment of socket assembly 200 for wear is best explained with reference to FIG. 4. FIG. 4 depicts a cross-section of socket assembly 200 with ball stud 141 extending through opening 137 (not shown) of cap 130 and ball 140 positioned within socket 212 of insert member 210. As is shown, peripheral sealing member 225, inner surface 118 of housing 110, backing member 300, closed rear portion 214 of insert member 210 and outer surface 220 of insert member 210 together form a closed reservoir 125 within housing 110 into which aperture 122 extends. To adjust socket assembly 200, a fluid is introduced into reservoir 125 through aperture 122. As fluid is pumped into aperture 122, reservoir 125 retains the fluid and the mounting pressure of the fluid urges insert member 210 and sealing member 225 toward cap 130 as indicated by the directional arrows in FIG. 4. Consequently, ball 140 remains in substantial contact with socket 212, even as wear reduces the outer diameter of ball 140 and increases the interior dimension of socket 212.

In other embodiments of the present invention, peripheral sealing member 225 may not be present and closed rear portion 214 of insert member 210 may be positioned against closed end 110b of housing 110. In these embodiments, diameter D2 of second outer surface portion 224 of insert member 210 is designed for a substantially zero-clearance fit within inner surface 118 of housing 110. Reservoir 125 is thereby formed by inner surface 118, first outer surface portion 222 of insert member 210 and closed end 110b of housing 110, and insert member's 210 zero-clearance fit with inner surface 118 prevents the fluid in reservoir 125 from escaping between insert member 210 and housing 110. Accordingly, the pressure of the fluid within reservoir 125 causes insert member 210 to move toward cap 130 to compensate for any wear-induced clearance between socket 212 and ball 140.

In an exemplary embodiment of the present invention, the fluid introduced into reservoir 125 is a lubricant such as grease or oil, and aperture 122 includes a one-way valve, grease port or grease fitting. In this embodiment of the present invention, the lubricant may be provided from a pressurized source such as a grease gun. In another embodiment of the present invention, aperture 122 is a ¼ turn relief port to which a hydraulic line and corresponding hydraulics are attached. The pressure of the hydraulics is pre-set to a level that corresponds to the desired fluid pressure within reservoir 125. A pressure sensor is used to monitor the fluid pressure within reservoir 125, and when the pressure falls below the pre-set level (thereby indicating that ball 140 and socket 212 have worn to create additional clearance in socket 212), more lubricant is introduced into reservoir 125 to adjust socket assembly 200 until the pressure within reservoir 125 returns to the pre-set level.

As the pressure of the lubricant in reservoir 125 causes insert member 210 to move toward cap 130 during an adjustment of socket assembly 200, insert member 210 should move axially. Rotational movement of insert member 210 is limited by positioning opening 302 and post member 226 for alignment at a location that is offset from the central axis of insert member 210. In an exemplary embodiment of the present invention, radial movement of insert member 210 is limited by sizing opening 302 of backing member 300 to receive post member 226 with substantially zero clearance. In other embodiments of the invention, other means may be used to limited the non-axial movement of insert member 210, for example by square or rectangular keys or multiple pins.

Figure 5:
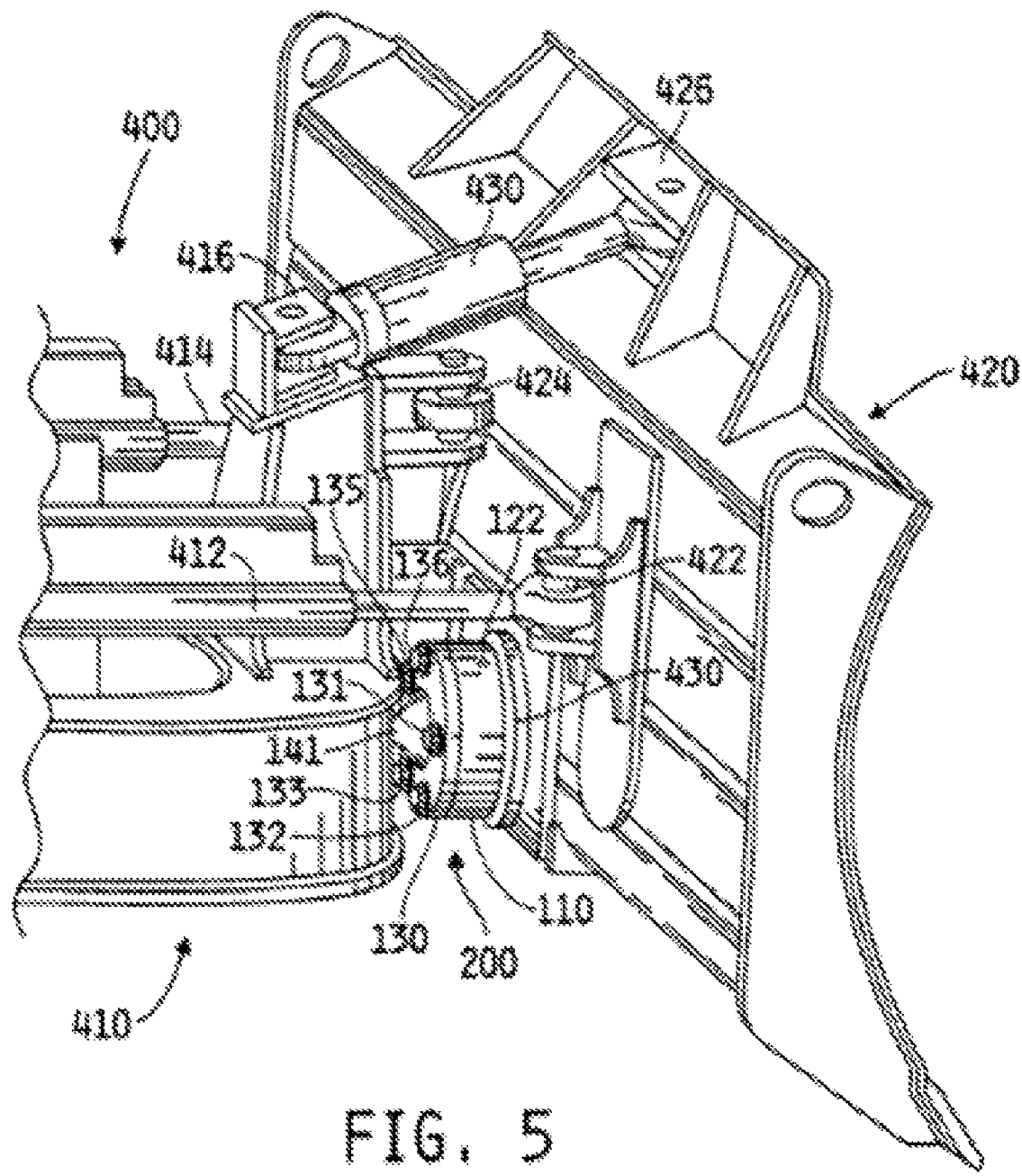
FIG. 5 is a perspective view of a machine implementing the socket assembly of the present invention.
Figure 6:
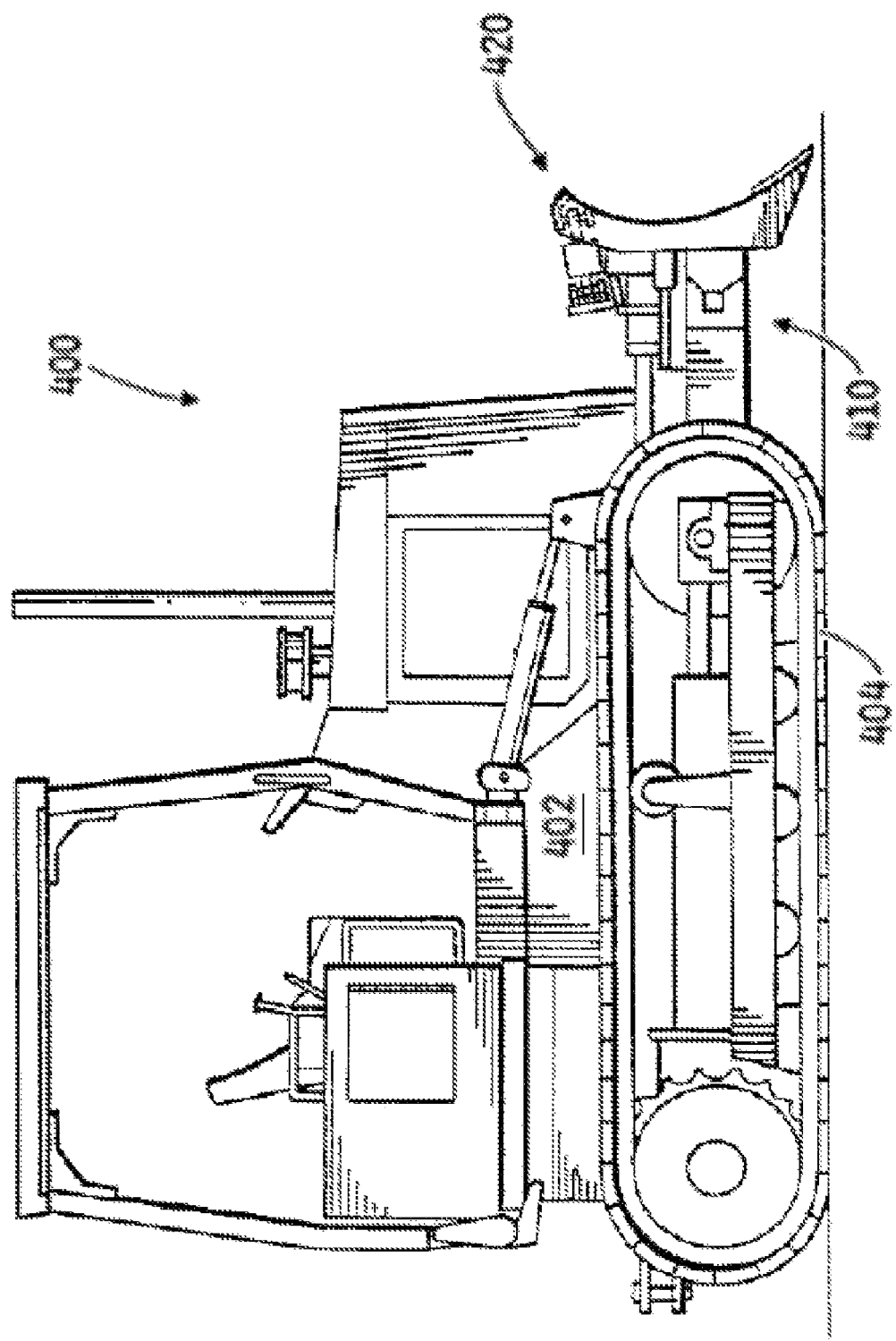
FIG. 6 is an elevational view of the machine of FIG. 5.

Socket assembly 200 of the present invention may be used in many applications requiring a ball and socket joint connection. One specific application in which socket assembly 200 may be used is in a ball and socket joint connection of a construction machine having any type of movable tool, implement, or attachment, for example, a scraper blade, a shovel loader, a boom, etc. Shown in FIGS. 5 and 6, machine 400 includes chassis 402, ground engaging mechanism 404 that is configured to support and/or propel the chassis, and a mounting frame 410. Ground engaging mechanism 404 is illustrated in FIG. 6 in the form of a track, but ground engaging mechanism 404 may also include wheels, for example. Mounting frame 410 includes first attachment arm 412 and second attachment arm 414. First attachment arm 412 is movably coupled to hinge member 422 of attachment 420, and second attachment arm 414 is movably coupled to hinge member 424 of attachment 420. Frame 410 and attachment 420 are further connected by control arm 430, which pivotally communicates with hinge member 416 of frame 410 and hinge member 426 of attachment 420.

Ball stud 141 with adjoining ball 140 (not shown) is affixed to the front end of frame 410, and ball 140 is disposed within socket 212 (not shown) of socket assembly 200. Housing 110 of socket assembly 200 is coupled to bracket 430 of attachment 420. In other embodiments of this application, housing 110 may be secured directly to attachment 420. Housing 110 includes aperture 122 into which fluid is introduced to adjust socket assembly 200. When insert member 210 (not shown) wears and is no longer useful, it may be replaced with a new insert member without the difficulties encountered when attempting to replace housing 110.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including:
  a chassis;
  at least one ground engaging mechanism configured to propel the chassis over the ground;
  an engine operatively coupled to the at least one ground engaging mechanism to power propulsion of the chassis;
  a ground engaging tool configured to move relative to the chassis; and
  a socket assembly that couples the ground engaging tool to the chassis, the socket assembly including:
    a ball;
    a housing having a bore with an inlet, the inlet receiving a fluid; and
    an insert member disposed within the bore and defining a socket that receives the ball to couple the ground engaging tool to the chassis, the insert member configured to move axially within the bore under pressure from the fluid.

2. The vehicle of claim 1, wherein the socket assembly includes a cap attached to the housing, the cap having an opening that is sized to receive the ball, and the cap is configured to retain the insert member within the bore of the housing.

3. The vehicle of claim 1, wherein the ball is configured to move in the socket when the insert member is urged against the ball.

4. The vehicle of claim 1, further including an extension connected to the ball, wherein the extension extends from one of the chassis and the ground engaging tool toward the socket.

5. The vehicle of claim 1, wherein the housing has an inner surface and the insert member has an outer surface and includes a sealing member peripherally attached to the outer surface, and the sealing member engages the inner surface of the housing.

6. The vehicle of claim 1, wherein the housing has an inner surface and the insert member has an outer surface, and the inner surface of the housing and the outer surface of the insert member together define a reservoir within the bore.

7. The vehicle of claim 6, wherein the ball is configured to move in the socket when a maximum pressure is applied to the reservoir.

8. The vehicle of claim 6, wherein the inlet comprises an aperture in the housing that is in fluid communication with the reservoir, the aperture introducing the fluid into the reservoir.

9. The vehicle of claim 6, wherein the insert member is configured to move axially toward the ball when a fluid is introduced into the reservoir.

10. The vehicle of claim 9, wherein the fluid includes at least one of oil and grease.

11. The vehicle of claim 1, wherein the ground engaging tool includes at least one of a blade, a shovel, and a boom.

12. The vehicle of claim 2, wherein the insert member and the cap are spaced apart to define a gap therebetween, the insert member being urged toward the cap under pressure from the fluid to minimize the gap.

13. The vehicle of claim 1, wherein the housing includes a longitudinal axis, the insert member moving along the longitudinal axis under pressure from the fluid, and wherein the insert member includes a spherical surface that mates with the ball, the longitudinal axis of the housing extending directly through both the spherical surface of the insert member and the ball.

14. The vehicle of claim 1, wherein the ball has a first half that faces out of the housing and a second half opposite the first half that faces into the housing, and wherein the insert member includes a spherical surface that mates with the ball, substantially all of the spherical surface of the insert member mating with the second half of the ball.

15. A vehicle including:
  a chassis;
  at least one ground engaging mechanism configured to propel the chassis over the ground;

an engine operatively coupled to the at least one ground engaging mechanism to power propulsion of the chassis;

a ground engaging tool configured to move relative to the chassis; and a socket assembly that couples the ground engaging tool to the chassis, the socket assembly including:

a ball;

a cylinder having a bore; and a piston disposed within the cylinder and defining a socket that receives the ball to couple the ground engaging tool to the chassis, the piston and the cylinder together defining a reservoir within the bore, the piston being configured to move axially within the bore when a fluid is introduced into the reservoir.

16. The vehicle of claim 15, further including an extension connected to the ball, wherein the extension extends from one of the chassis and the ground engaging tool toward the socket.

17. The vehicle of claim 15, wherein the ground engaging tool includes at least one of a blade, a shovel, and a boom.

18. The vehicle of claim 15, wherein the cylinder includes a one-way valve that is configured to introduce the fluid into the reservoir.

19. The vehicle of claim 15, wherein the fluid includes at least one of oil and grease.

20. The vehicle of claim 15, further including:

a post that extends from the piston; and a backing member coupled to the cylinder, wherein the backing member includes an opening offset from a central axis of the piston to receive the post.

21. The vehicle of claim 15, wherein the socket assembly includes a cap attached to the cylinder and an extension connected to the ball, the cap has an opening that is sized to receive the extension, and the cap is configured to retain the piston within the cylinder.

22. The vehicle of claim 15, wherein the ball is configured to move in the socket when the piston is urged against the ball.

23. The vehicle of claim 15, wherein the ball is configured to move in the socket when a maximum pressure is applied to the reservoir.

24. The vehicle of claim 15, wherein the piston includes a spherical surface that mates with the ball, substantially all of the spherical surface of the piston being urged toward a center of the ball when the piston moves axially within the bore.

25. A method of adjusting a socket assembly of a vehicle, the method including the steps of:

providing a vehicle that includes:

a chassis;

at least one ground engaging mechanism configured to propel the chassis over the ground;

an engine operatively coupled to the at least one ground engaging mechanism to power propulsion of the chassis;

a ground engaging tool configured to move relative to the chassis; and a socket assembly that couples the ground engaging tool to the chassis, the socket assembly including:

a ball;

a cylinder having a bore; and a piston disposed within the cylinder and defining a socket that receives the ball to couple the ground engaging tool to the chassis, the piston and the cylinder together defining a reservoir within the bore; and introducing a fluid into the reservoir of the socket assembly to urge the piston axially within the bore against the ball, the ball moving in the socket when the piston is urged against the ball.

26. The method of claim 25, further including the step of capping the inlet of the bore to retain the piston in the cylinder.

27. The method of claim 25, further including the step of monitoring a pressure of the fluid in the reservoir.

28. The method of claim 25, wherein the step of introducing the fluid into the reservoir involves increasing a pressure in the reservoir to a maximum value, the ball being able to move in the socket when the pressure is increased to the maximum value.

29. The method of claim 25, further including the step of replacing the piston.

30. The method of claim 25, further including the steps of:

moving the ball against the piston to create a space between the ball and the piston due to wear; and introducing additional fluid into the reservoir of the socket assembly to minimize the space between the ball and the piston.

* * * * *